(No Model.) 2 Sheets—Sheet 2.
V. W. BLANCHARD.
REFRIGERATING CAN.
No. 385,993. Patented July 10, 1888.
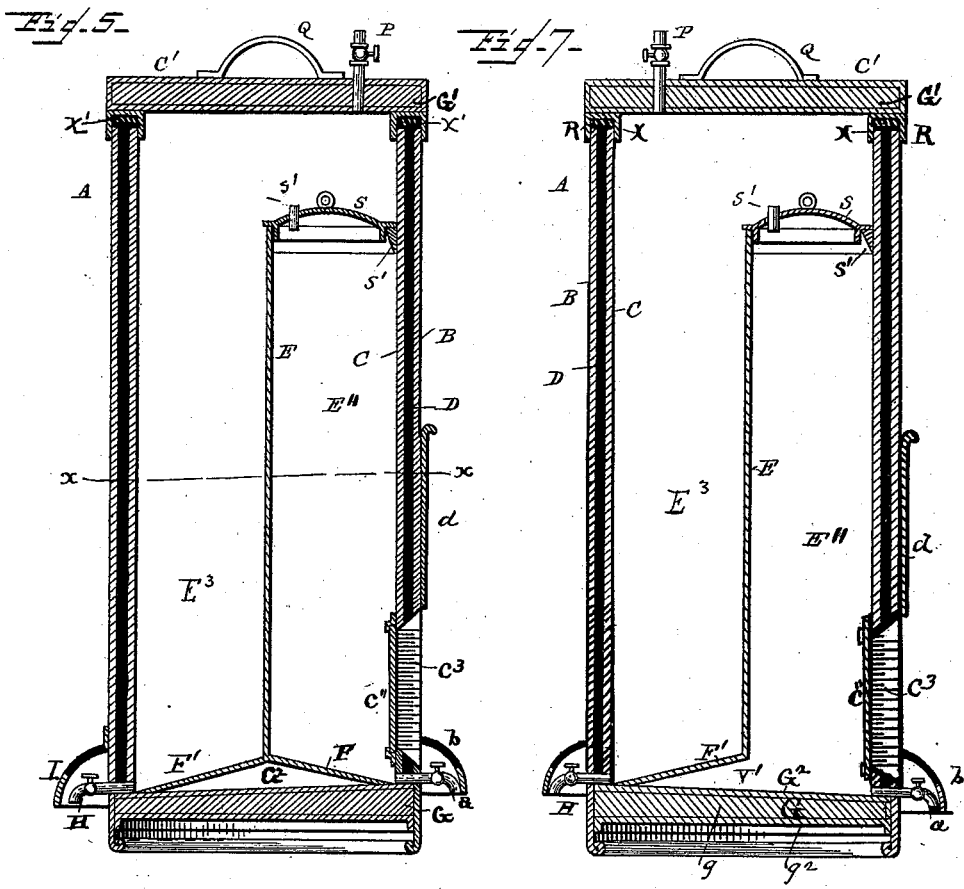
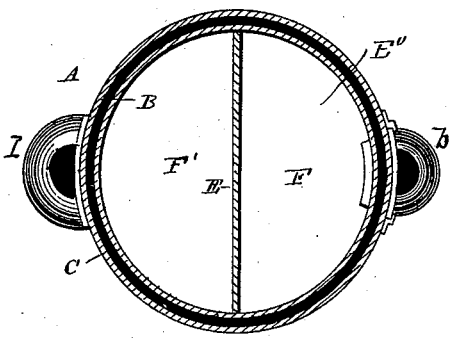
WITNESSES.
Edwin T. Yewell
A. E. Sowell
INVENTOR.
Virgil W. Blanchard
by T. H. Alexander
Attorney.

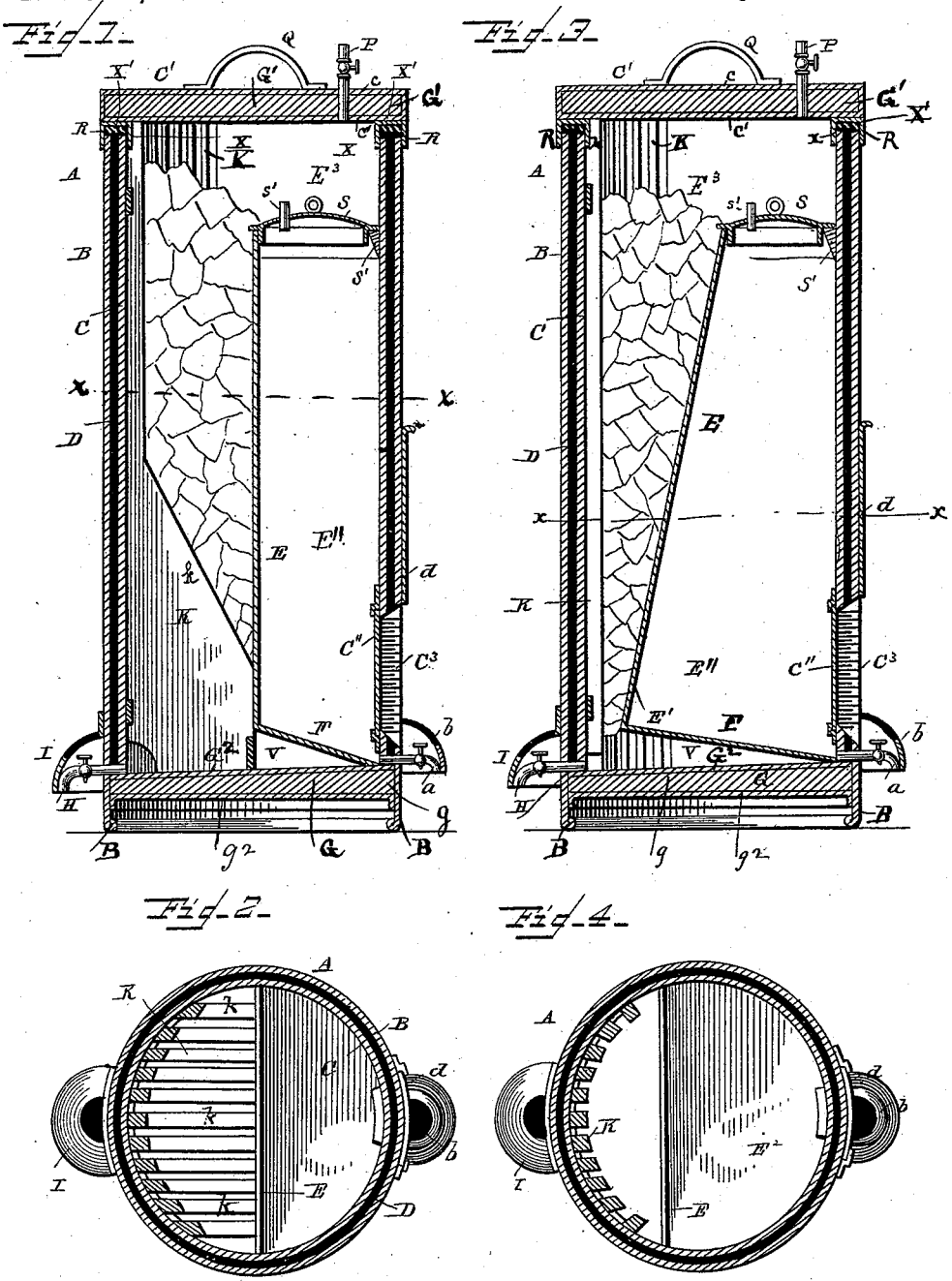

United States Patent Office.

VIRGIL W. BLANCHARD, OF NEW YORK, N. Y.

REFRIGERATING-CAN.

SPECIFICATION forming part of Letters Patent No. 385,993, dated July 10, 1888.

Application filed August 18, 1887. Serial No. 247,285. (No model.)

*To all whom it may concern:*

Be it known that I, VIRGIL W. BLANCHARD, of New York city, in the county of New York and State of New York, have invented certain new and useful Improvements in Refrigerating-Cans; and I do hereby declare that the following is a full, clear, and exact description thereof, reference being had to the accompanying drawings, and to the letters of reference marked thereon, which form part of this specification, in which—

Figure 1 represents a central vertical section of my improved can. Fig. 2 is a transverse section of the same on line $x\,x$, Fig. 1. Fig. 3 is a similar view to Fig. 1, showing a modification. Fig. 4 is a transverse section on line $x\,x$, Fig. 3. Fig. 5 is a vertical central sectional view of a second modification. Fig. 6 is a cross-section on line $x\,x$, Fig. 5. Fig. 7 represents in vertical section a third modification.

This invention relates to improvements in refrigerating-cans; and its special object is to provide an efficient creaming-can for separating cream from milk or for preserving foods; and the invention consists in the novel construction and arrangement of parts hereinafter described, illustrated in the drawings, and particularly specified in the appended claims.

Before proceeding with the description of the present invention I will state that several features of the refrigerating-can herein described are shown in my applications for Letters Patent Serial No. 242,939, filed June 30, 1887, and Serial No. 247,862, filed August 25, 1887. Whatever is shown in this application and not claimed, but claimed in either of the applications referred to, is herein disclaimed.

Referring to the drawings, A represents a can, preferably cylindrical, formed of external wall, B, and internal wall, C, between which walls is left an air-space, D, which may be filled with non-conducting packing, if desired.

G designates the bottom of the can, secured to the walls thereof, as shown, and preferably composed of an upper plate, $G^2$, lower plate, $g^2$, and an interposed wood disk, $g$, which parts are properly united in any suitable manner.

The wall B is extended below bottom G, as shown, to prevent injury thereto.

C' indicates the cover of can A, composed of upper plate, $c$, lower plate, $c'$, and interposed wood disk G', as shown, properly secured together.

Q is the cover-handle. This cover is provided with depending annular flanges R and X, which embrace between them the upper ends of the walls of can A and tightly close the same.

$x$ is a gasket of proper material placed between flanges R and X.

P indicates a valved vent-pipe passing through cover C', through which communication can be established between the interior of can A and the atmosphere. The top plate, $G^2$, of bottom G is preferably inclined, so as to drain the fluids toward a faucet, H, as shown.

E represents a partition of heat-conducting metal secured in can A, as shown, dividing the interior of the can into two compartments, $E^3\,E''$. Compartment $E''$ has an inclined supplementary bottom, F, as shown, which sheds the fluids in said compartment to a draw-off faucet, $a$, in the wall of can A, as shown.

The faucets H and $a$ are protected by guards or fenders I $b$, respectively, provided with openings through which the faucets can be readily operated.

Near the bottom of the can at one side a portion of the wall is cut away, and the opening thus formed is closed by means of a transparent sheet, $C''$, of glass or other material secured to the inside of the can opposite the opening in any convenient manner, so as to prevent leakage. Outside of the transparent sheet, and at one of the side edges of the cut-away portion, is applied a scale, $C^3$, for indicating the depth of the fluid in the lower part of the compartment $E''$. The transparent sheet may be protected exteriorly by a slide-door, $d$.

The partition E, preferably, does not extend to the top of can A, so that compartment $E''$ is surrounded, except at one side, by compartment $E^3$, and compartment $E''$ is closed by an arched cover, S, having a vent-tube, as shown, which cover is supported upon the top of partition E and a ledge, $s'$, on the wall C, as shown.

In Figs. 3 and 4 is shown a slight modification in which the can A is identical with that already described, except that partition E is inclined instead of vertical. This increases the extent of compartment E″ and causes the enlargement of bottom F. When thus arranged, as shown in Figs. 3 and 4, the partition E forms an inclined plane, which supports the ice in compartment E³.

K, Figs. 1 to 4, indicates a vertical rack arranged against the wall C in compartment E³, which rack has a bottom wedge-shaped portion, k, that causes the ice to press against the partition E in its descent, as will be obvious from said figures. This rack is made removable.

It will be obvious that this rack will prevent contact of the ice with the inner wall of the can, the rack forming a kind of non-conducting partition between the ice and wall. The inclined portion k of rack K, while causing the ice to keep in contact with partition E, also effects a saving of ice by narrowing the width of the ice-space in chamber E³, as is evident.

In the can shown in Figs. 3 and 4 the rack K is unnecessary; but, if desired, the rack without portions k may be employed to prevent contact of the ice with the wall C.

In Figs. 5 and 6 a second modification is shown. In this the space V is closed by inserting a supplementary bottom, F′, in compartment E³, and rack K is omitted. In other respects the can in Figs. 5 and 6 is identical with the can represented by Fig. 1.

Fig. 7 is a third modification showing a can similar to that shown in Fig. 5, except that the bottom F of compartment E″ is omitted, bottom F′ of compartment E³ retained, and plate G² inclined in an opposite direction, forming the bottom of compartment E″, which in this instance extends under compartment E³, as shown at V′. The food or milk to be cooled is placed in compartment E″, and compartment E³ is filled with ice, refrigerating the milk or food in compartment E″, as is evident. When in use I allow the water to drain from the ice-compartment, so that the ice therein will keep dry. When milk has been placed in compartment E″ and the cream separated therefrom by its rapid cooling, the milk can be withdrawn through faucet a, and through sight-opening C″ it can be seen when the cream is at the bottom, and the scale C³ may be so graduated as to show the quantity thereof by its height in said compartment. In some cases can A might have a single instead of a double wall, although I prefer the latter construction. Vent-tube s′ permits gases to escape from compartment E″ into compartment E³.

It will be perceived that by the peculiar construction of my can an air-bath will be formed around the milk-receptacle, instead of a surrounding cooling medium of water, as usual, which water, besides absorbing the animal emanations given off by the milk when warm and holding such matters confined where they can be reabsorbed by the cream, also tends to contaminate the milk with the organic emanations from the water, which is never, under the most advantageous circumstances, perfectly pure.

Having described my invention, I claim—

1. The herein described refrigerating-can, composed of walls B C, inclined bottom G, and cover C′, and the transverse metallic partition E, secured to the inner wall of the can, the inclined bottom F at one side of the partition, the cover S, resting on the partition and a support on the inner wall of the can, and the draw-off faucets and sight-tube, all constructed and arranged substantially as and for the purpose described.

2. The herein-described refrigerating-can having double outer walls and inclined bottom G, valved cover C′, and drain-faucet H, with a metallic partition, E, secured vertically and transversely within the can to the inner wall thereof, the ledge S′ on the inner wall of the can at one side of partition E, valved cover S, resting on the ledge and partition, bottom F, and faucet a, all constructed and arranged substantially as and for the purpose described.

3. A refrigerating-can comprising double walls B C, inclined bottom G, valved cover C′, and faucet H, and the vertical metallic partition E in said can, the ledge S′ on the inner wall of the can, valved cover S, resting on the partition and ledge, inclined bottom F, faucet a, and rack K, all constructed and arranged substantially in the manner as and for the purpose described.

In testimony that I claim the foregoing as my own I affix my signature in presence of two witnesses.

VIRGIL W. BLANCHARD.

Witnesses:
LYMAN E. KNAPP,
MERRITT STOW.